US 11,447,272 B2

(12) United States Patent
Lampazzi et al.

(10) Patent No.: US 11,447,272 B2
(45) Date of Patent: Sep. 20, 2022

(54) INTERACTIVE ELECTRONIC CHECKLISTS FOR AUTONOMOUS AIRCRAFT

(71) Applicant: Lockheed Martin Corporation, Bethesda, MD (US)

(72) Inventors: Margaret MacIsaac Lampazzi, Newtown, CT (US); Carl John Pankok, Jr., Philadelphia, PA (US); Igor Cherepinsky, Sandy Hook, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 142 days.

(21) Appl. No.: 16/923,143

(22) Filed: Jul. 8, 2020

(65) Prior Publication Data

US 2022/0009651 A1 Jan. 13, 2022

(51) Int. Cl.
*B64F 5/60* (2017.01)
*G06F 3/0482* (2013.01)

(52) U.S. Cl.
CPC .............. *B64F 5/60* (2017.01); *G06F 3/0482* (2013.01)

(58) Field of Classification Search
CPC ................................ B64F 5/60; G06F 3/0482
See application file for complete search history.

(56) References Cited

U.S. PATENT DOCUMENTS

| 10,402,730 B2 | 9/2019 | Whitlow et al. |
| 2015/0355832 A1* | 12/2015 | Dostal .................... G01C 21/00 715/771 |
| 2018/0114199 A1 | 4/2018 | Sahay et al. |
| 2018/0334244 A1 | 11/2018 | Cherepinsky et al. |
| 2019/0227558 A1* | 7/2019 | Lampazzi ............ G05D 1/0202 |
| 2019/0324456 A1 | 10/2019 | Ryan et al. |
| 2020/0168103 A1* | 5/2020 | Holder .................. G01C 21/20 |

* cited by examiner

*Primary Examiner* — Cao H Nguyen
(74) *Attorney, Agent, or Firm* — Foley & Lardner LLP

(57) ABSTRACT

A technique relates to interactive aircraft operation. An interactive electronic checklist is selected from a plurality of interactive electronic checklists, the interactive electronic checklists each comprising checklist tasks. It is perceived that one or more of the checklist tasks in the interactive electronic checklist is executable by an autonomous system. The one or more of the checklist tasks is performed using the autonomous system, an operator being designated to perform any other ones of the checklist tasks.

19 Claims, 12 Drawing Sheets

INTERACTIVE ELECTRONIC CHECKLISTS FOR AUTONOMOUS AIRCRAFT

STATEMENT OF FEDERAL SUPPORT

This invention was made with government support under HR0011-17-9-0004 awarded by DARPA. The government has certain rights in the invention.

BACKGROUND

Exemplary embodiments relate to the art of rotary or fixed wing aircraft, and more particularly, to interactive electronic checklists for autonomous aircraft.

BRIEF DESCRIPTION

According to one or more embodiments, a method for interactive aircraft operation is provided. The method includes selecting an interactive electronic checklist from a plurality of interactive electronic checklists, the interactive electronic checklists each comprising checklist tasks. The method includes perceiving that one or more of the checklist tasks in the interactive electronic checklist is executable by an autonomous system, and performing the one or more of the checklist tasks using the autonomous system, an operator being designated to perform any other ones of the checklist tasks.

In addition to one or more of the features described above or below, or as an alternative, further embodiments could include wherein the autonomous system is operable to select the interactive electronic checklist according to a phase in aircraft operation.

In addition to one or more of the features described above or below, or as an alternative, further embodiments could include wherein the autonomous system is operable to select the interactive electronic checklist according to a threshold condition occurring on an aircraft.

In addition to one or more of the features described above or below, or as an alternative, further embodiments could include wherein the autonomous system is operable to receive a diagnosis or determine the diagnosis of threshold conditions occurring on an aircraft, and wherein responsive to the diagnosis, the autonomous system is operable to prioritize the threshold conditions and select the interactive electronic checklist corresponding to a highest priority of the threshold conditions.

In addition to one or more of the features described above or below, or as an alternative, further embodiments could include wherein each of the checklist tasks comprises an indication of whether completion is performable by the autonomous system.

In addition to one or more of the features described above or below, or as an alternative, further embodiments could include wherein the indication is predetermined in advance.

In addition to one or more of the features described above or below, or as an alternative, further embodiments could include wherein the at least one of the one or more of the checklist tasks is performed by the autonomous system in chronological order when required with the any other ones of the checklist task to be performed by the operator.

In addition to one or more of the features described above or below, or as an alternative, further embodiments could include checking whether permission is required for the autonomous system to execute the one or more of the checklist tasks in the interactive electronic checklist and requesting the permission for the autonomous system to execute the one or more of the checklist tasks in the interactive electronic checklist when required. The one or more of the checklist tasks is performed using the autonomous system responsive to receiving the permission or responsive to requiring no permission. Receiving the permission comprises receiving a selection permitting the one or more of the checklist tasks to be performed by the autonomous system.

According to one or more embodiments, a system for interactive aircraft operation is provided. The system includes a processor and memory coupled to the processor and comprising computer-executable instructions that, when executed by the processor, cause the processor to perform operations. The operations include selecting an interactive electronic checklist from a plurality of interactive electronic checklists, the interactive electronic checklists each comprising checklist tasks. The operations include perceiving that one or more of the checklist tasks in the interactive electronic checklist is executable autonomously, performing the one or more of the checklist tasks autonomously, an operator being designated to perform any other ones of the checklist tasks.

According to one or more embodiments, a computer program product for interactive aircraft operation comprising a computer readable storage medium having program instructions embodied therewith, the program instructions executable by a processor to cause the processor to perform operations. The operations include selecting an interactive electronic checklist from a plurality of interactive electronic checklists, the interactive electronic checklists each comprising checklist tasks. The operations include determining that one or more of the checklist tasks in the interactive electronic checklist selected is executable autonomously, and checking whether permission is required to autonomously execute at least one of the one or more of the checklist tasks in the interactive electronic checklist. The operations include requesting permission for autonomous execution of at least one of the one or more of the checklist tasks in the interactive electronic checklist. Also, the operations include responsive to receiving permission to autonomously execute the at least one of the one or more of the checklist tasks or responsive to requiring no permission to execute the at least one of the one or more of the checklist tasks, performing the at least one of the one or more of the checklist tasks autonomously, an operator being designated to perform any other ones of the checklist tasks.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatuses are presented herein by way of exemplification and not limitation with reference to the Figures. One or more embodiments provide interactive electronic checklists for autonomous aircraft and optionally piloted vehicles. Electronic checklists have replaced paper in the cockpit and exist as a reminder/aid for pilots. In one or more embodiments, aircraft with autonomy (i.e., autonomous system) are configured to execute checklist tasks and/or exchange responsibility of checklist tasks with the human operator. However, current layouts/designs for electronic checklists do not address autonomy requirements for shared checklists and transfer of checklist tasks to different agents.

Accordingly, one or more embodiments disclose interactive electronic checklists which address the need for a more advanced form of a checklist. The interactive electronic checklist is one that allows the pilot to see his/her responsible checklist tasks at a glance, as well as checklist tasks for which the autonomy is responsible. Similarly, use of interactive electronic checklists provide a means for the pilot to transfer assignment of checklist tasks back to the autonomy and/or take control of a checklist task from the autonomy in a teamwork paradigm analogous to a two-person crew. One or more embodiments provide a shared teamwork model for autonomous aircraft with a single human pilot/operator. The terms operator and pilot can be used interchangeably. The terms autonomy, autonomous system, autopilot, etc., can be utilized interchangeably to refer to the ability or capacity to operate without requiring human intervention. Agents can refer to operator and/or the autonomous system.

Figure 1:
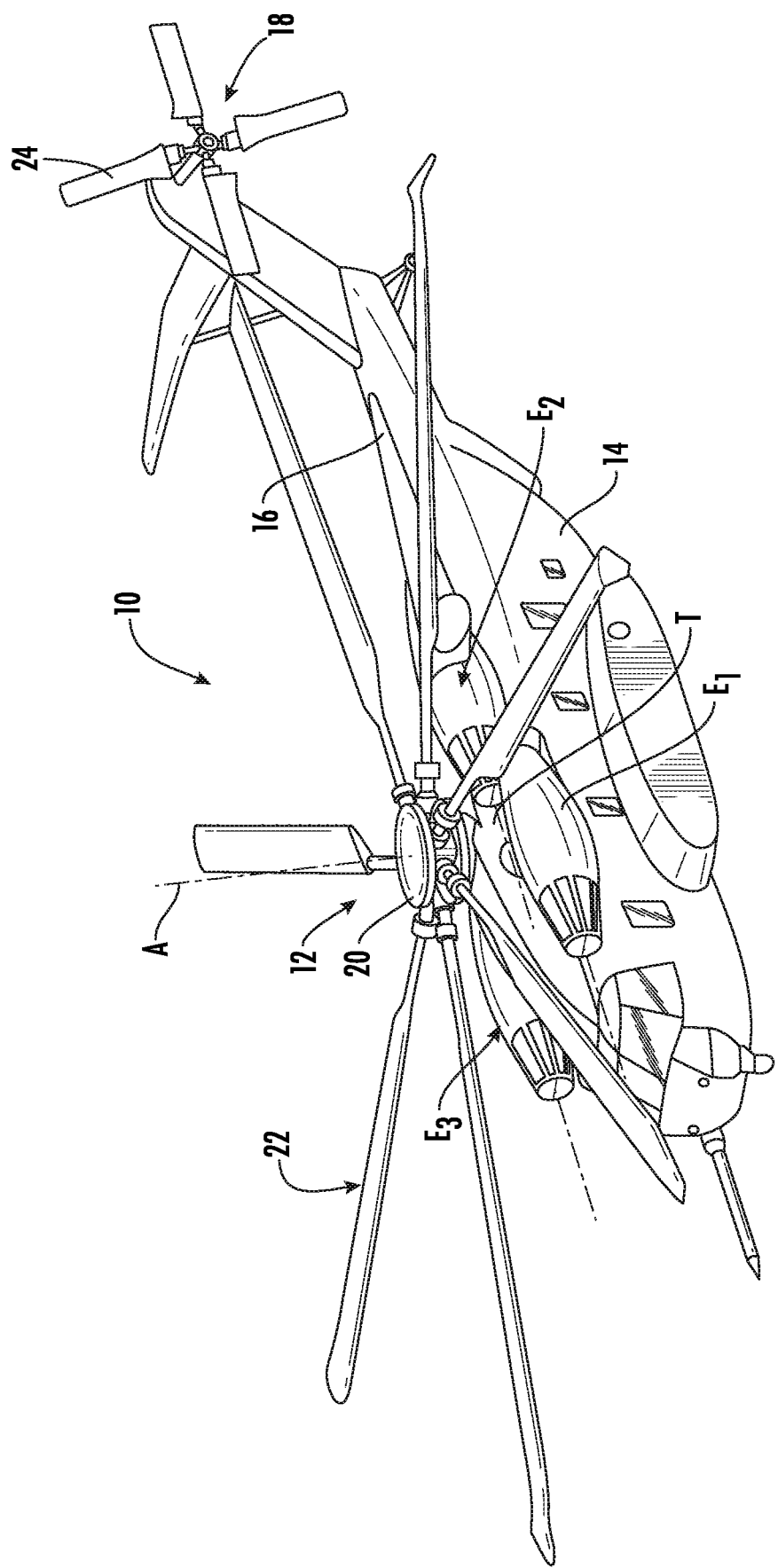
FIG. 1 depicts a rotary wing aircraft in accordance with one or more embodiments.

FIG. 1 schematically illustrates an exemplary vertical takeoff and landing (VTOL) rotary wing aircraft 10 having a main rotor assembly 12. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
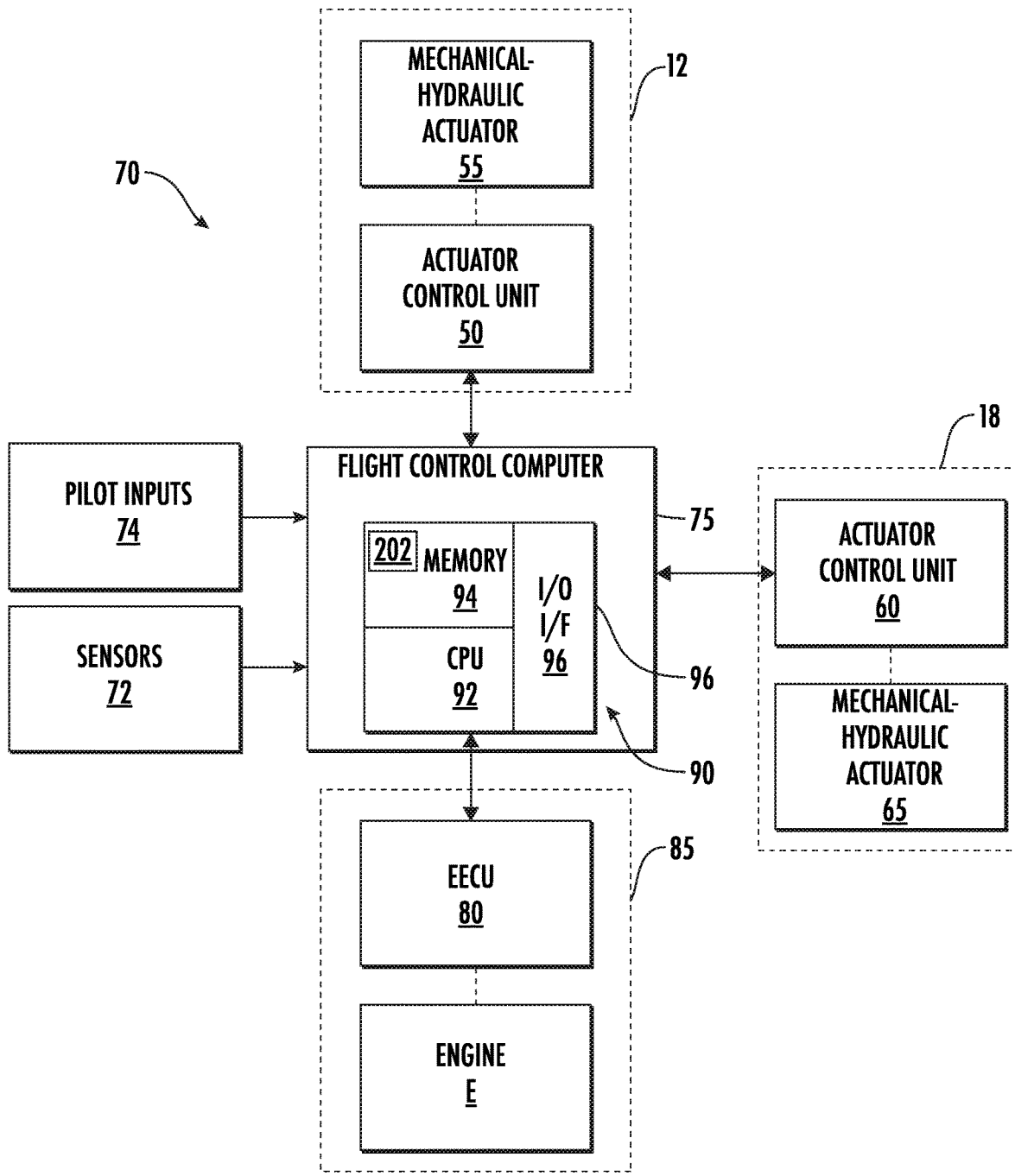
FIG. 2 depicts a schematic diagram of a flight control system in accordance with one or more embodiments.

Portions of the aircraft 10, such as the main rotor system 12 and the tail rotor system 18 for example, are driven by a flight control system 70 illustrated in FIG. 2. In one embodiment, the flight control system 70 is a fly-by-wire (FBW) control system. In a FBW control system, there is no direct mechanical coupling between a pilot's controls and movable components or control surfaces, such as rotor blade assemblies 20 or propeller blades 24 for example, of the aircraft 10 of FIG. 1. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands to control the lift, propulsive thrust, yaw, pitch, and roll forces and moments of the various control surfaces of the aircraft 10.

In response to inputs from the sensors 72 and pilot inputs 74, the FCC 75 transmits signals to various subsystems of the aircraft 10, such as the main rotor system 12 and the tail rotor system 18. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10. The pilot inputs 74 can provide autonomous control of the aircraft 10 without human intervention and/or enable the aircraft 10 to be an optionally piloted vehicle.

The main rotor system 12 can include an actuator control unit 50 configured to receive commands from the FCC 75 to control one or more actuators 55, such as a mechanical-hydraulic actuator, for the rotor blade assemblies 20 of FIGS. 1 and 2. In an embodiment, pilot inputs 74 including cyclic and/or collective commands may result in the actuator control unit 50 driving the one or more actuators 55 to adjust a swashplate assembly to control the rotor blade assemblies 20 of FIG. 1. Alternatively, the FCC 75 can directly control the one or more actuators 55, and the actuator control unit 50 can be omitted.

The tail rotor system 18 can include an actuator control unit 60 configured to receive commands from the FCC 75 to control one or more actuators 65, such as a mechanical-hydraulic actuator, associated with one or more propeller blades 24. In an embodiment, pilot inputs 74 include a propeller pitch command for the actuator control unit 60 to drive the one or more actuators 65 for controlling the propeller blades FIG. 1. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected to a corresponding engine E. Each engine E may include one or more instances of the EECU 80 to control engine output and performance. Engines E may be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and may communicate with the control units 50, 60, 80, and other subsystems (not depicted).

The FCC 75 also includes an interactive electronic checklist module 202. The interactive electronic checklist module 202 may be in and/or coupled to memory 94. The interactive electronic checklist module 202 can be implemented as instructions stored on a computer-readable storage medium, as hardware modules, as special-purpose hardware (e.g., application specific hardware, Application Specific Integrated Circuits (ASICs), as embedded controllers, hardwired circuitry, etc.), or as some combination or combinations of these. In examples, the module described herein can be a combination of hardware and programming. The programming can be processor executable instructions stored on a tangible memory, and the hardware can include processing circuitry 92 for executing those instructions. Thus, a system memory can store program instructions that when executed by processing circuitry 92 implement the module described herein. Alternatively or additionally, the FCC 75 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 3:
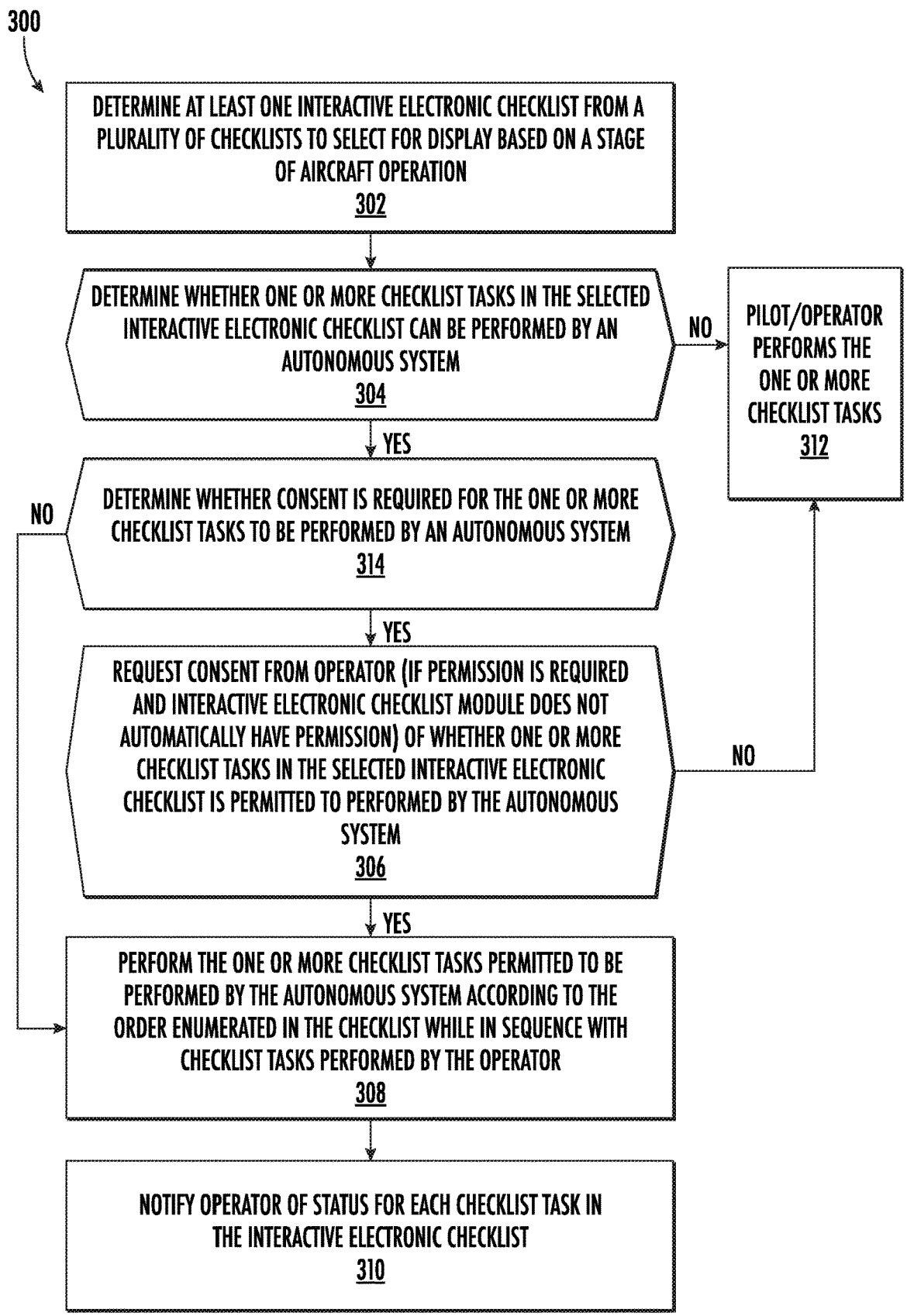
FIG. 3 is a flowchart of a process using an interactive electronic checklist module to autonomously perform checklist tasks of an interactive electronic checklist in accordance with one or more embodiments.
Figure 4:
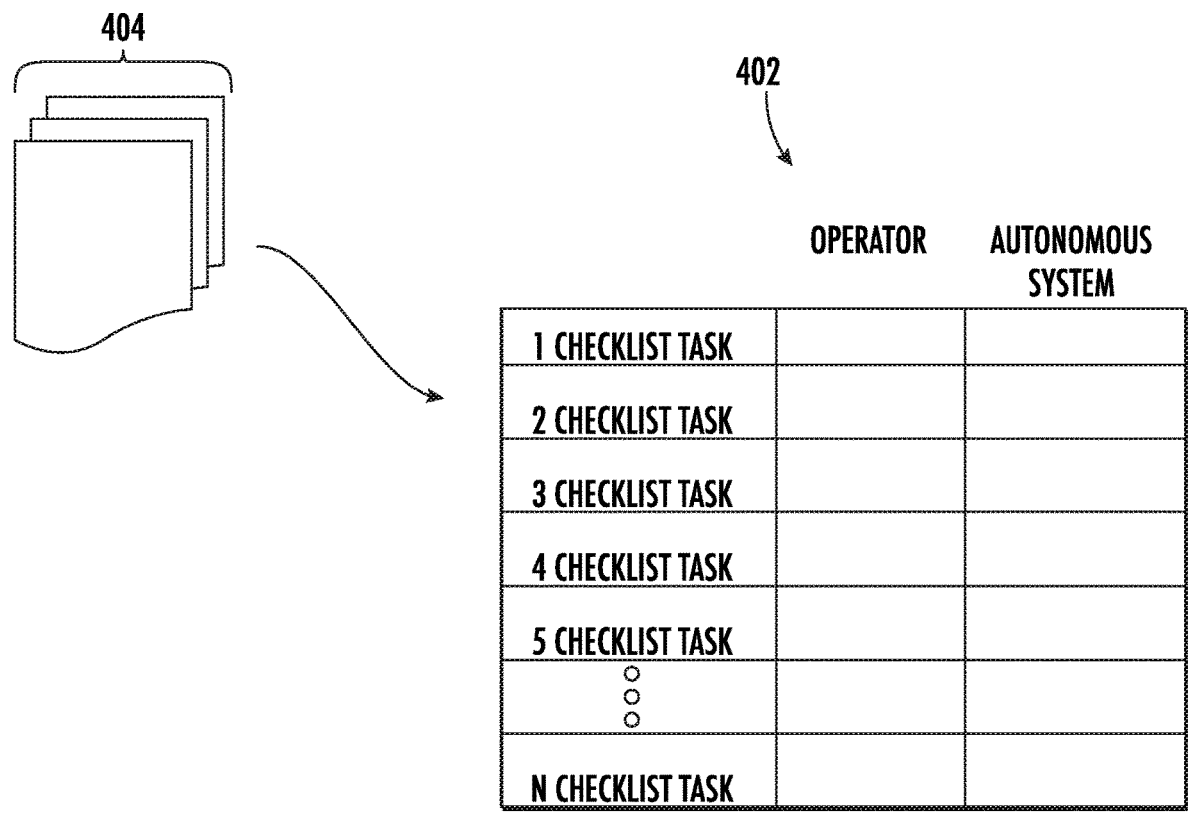
FIG. 4 depicts a block diagram of example interactive electronic checklists in accordance with one or more embodiments.

The interactive electronic checklist module 202 is configured to autonomously command the FCC 75 of the aircraft 10 to provide interactive electronic checklists in which autonomy of interactive electronic checklist module 202 coupled to FCC 75 is configured to execute checklist tasks autonomously and/or exchange responsibility of checklist tasks with the human operator. FIG. 3 is a flowchart of a process 300 using interactive electronic checklist module 202 to control flight control system 70 to autonomously perform one or more checklist tasks in an interactive electronic checklist for aircraft 10 according to one or more embodiments. FIG. 4 depicts a block diagram of example interactive electronic checklists according to one or more embodiments.

Referring to FIGS. 3 and 4, interactive electronic checklist module 202 of flight control system 70 is configured to autonomously determine at least one interactive electronic checklist such as interactive electronic checklist 402 from numerous interactive electronic checklists 404 at block 302. Interactive electronic checklist module 202 is configured to select interactive electronic checklist 402 based on the stage or phase of aircraft operation of aircraft 10 and/or based on threshold conditions discussed below. The stage or phase of aircraft operation of aircraft 10 can include pre-takeoff, engine check, cruising, before mission (which could be an attack mission (e.g., bombing mission), medical mission, troop delivery mission, etc.), approach of landing zone, landing phase, etc. As seen in FIG. 4, interactive electronic checklists 404 have many elements including, but not limited to, checklist tasks 1-N, identification of who is responsible for each checklist task such as the human operator, autonomous system via interactive electronic checklist module 202, or both. Each of the interactive electronic checklists 404 is designated for a particular phase in aircraft operation of aircraft 10 and/or threshold condition. One or more interactive electronic checklists 404 can be selected based on being for a stage or phase of flight, for example, before takeoff, after takeoff, climb to cruise, cruise flight, descent, approach, before landing, etc. Other example interactive electronic checklists 404 can include cruise checklist, prelanding checklist, missed approach checklist, etc. There can be threshold conditions which occur on and/or are associated with aircraft 10, and one or more threshold conditions may be associated with multiple interactive electronic checklists 404. The threshold conditions include one or more conditions that if occurring would trigger display of one or more interactive electronic checklists 404, which could be normal checklists and/or abnormal or emergency checklists. For example, interactive electronic checklist module 202 (e.g., via FCC 75) can detect the threshold condition on aircraft 10, which acts as a trigger for interactive electronic checklist module 202 to determine the appropriate interactive electronic checklists 404 that should be selected and displayed based on the threshold condition. As such, the threshold condition on aircraft 10 is recognized as a trigger or indication which can be utilized by interactive electronic checklist module 202 to select one or more applicable interactive electronic checklists 402 associated with the threshold condition. For triggering one or more interactive electronic checklists 404, the threshold condition can include triggers for normal checklists (in addition to flight phase) and triggers for abnormal or emergency checklists. For example, if interactive electronic checklist module 202 detects aircraft 10 is slowing down and departing from the planned takeoff course/route, interactive electronic checklist module 202 could determine that aircraft 10 is circling back to the airport and prompt the pilot complete the before landing checklist. For abnormal or emergency conditions, interactive electronic checklist module 202 can leverage parameter thresholds or cockpit indications as thresholds. For example, if interactive electronic checklist module 202 (via FCC 75) can directly monitor engine torque/output and then detects that engine torque is low, interactive electronic checklist module 202 can use this information to prompt the correct interactive electronic checklist 404. Also, if interactive electronic checklist module 202 monitors the warning or caution capsules, interactive electronic checklist module 202 can spawn the correct interactive electronic checklist 404.

Example threshold conditions may include any off nominal condition such as engine failure, hydraulic failure, low fuel or fuel depletion, electrical system failure, air vehicle or flight control issue, ice accumulation, oil temperature, engine torque split, metal chip detection, etc. Although certain specific threshold conditions have been identified for explanation purposes and not limitation, it should be appreciated that threshold conditions can be related to any number of subsystem failures including electrical, airframe, flight controls, door unlocked, smoke in the cockpit, etc. In some cases, there can be more than one threshold condition occurring simultaneously, and interactive electronic checklist module 202 is configured to select for display the interactive electronic checklist(s) 402 for the threshold condition having the highest priority or criticality. The threshold conditions can be ranked in advance. For example, when both a hydraulic failure and an electrical condition are occurring, the interactive electronic checklist module 202 is configured to select the interactive electronic checklist associated with the hydraulic failure first and subsequently move to the interactive electronic checklist for the electrical condition, especially if backup generators are available. Also, interactive electronic checklist module 202 is configured to rebuild or modify an interactive electronic checklist such as after an electrical failure.

As discussed herein, interactive electronic checklist module 202 is configured to differentiate what interactive electronic checklists 404 to perform based on both phase of flight and aircraft configuration or context. For example, upon takeoff interactive electronic checklist module 202 will determine that the next applicable normal checklist is the "after takeoff checklist"; if for example the pilot experiences an issue after takeoff (for example, a bird hits his the windscreen) and needs to turn around and land the aircraft 10, interactive electronic checklist module 202 is configured to determine that the "after takeoff checklist" may not be applicable, but rather determines the "before landing checklist" is needed even though interactive electronic checklist module 202 did not perform the normal sequence of a flight. Another example is when aircraft 10 is on approach to land, the pilot may decide to go around and selects the "go around" button; accordingly, interactive electronic checklist module 202 correspondingly reconfigures and assesses that after climbing to X altitude, the "after takeoff checklist" is now applicable.

Returning to FIG. 3, at block 304, interactive electronic checklist module 202 of flight control system 70 is configured to autonomously determine whether one or more checklist tasks in selected interactive electronic checklist 402 can be performed by the autonomous system via interactive electronic checklist module 202. The checklist tasks capable of being performed by interactive electronic checklist module 202 can be identified in advance. Also, to determine whether interactive electronic checklist module 202 can perform a checklist task, the interactive electronic checklist module 202 is configured to check whether the FCC 75 and/or a vehicle management computer (VMC) (not shown) has access to control action(s) needed to perform the checklist task, and if so, the checklist task is identified as being capable of execution by interactive electronic checklist module 202. In one or more embodiments, autonomously performing one or more checklist tasks in an interactive electronic checklist for aircraft 10 does not include autonomously flying and/or navigating aircraft 10 by an autopilot, and/or causing aircraft 10 to be autonomously flown and/or navigated by the autopilot. Checklist tasks are actions, procedures, steps, and checks that relate to the proper functioning of aircraft 10. When interactive electronic checklist module 202 determines that no checklist tasks in selected interactive electronic checklist 402 can be performed by interactive electronic checklist module 202, the flow proceeds to block 312 in which the pilot/operator performs the checklist tasks and/or is designated to perform the checklist tasks. Examples of checklist tasks that cannot be performed by interactive electronic checklist module 202 may include checklist task associated with cockpit switches or components that are not monitored or controlled. Additional examples of checklist tasks that cannot be performed by interactive electronic checklist module 202 may include items that do not have a data feed to FCC 75. For example, an aircraft with steam gauges may have an altimeter setting that does not send an electronic signal to FCC 75. Another example is a rotary knob to turn windshield wipers on or off. Yet another example can be a procedure for an abnormal scenario such as flying into volcanic ash or a bird strike hitting the windscreen. Examples of when checklist tasks cannot be performed by interactive electronic checklist module 202 relate to instances in which interactive electronic checklist module 202 has no knowledge of the event, and therefore can display no interactive electronic checklist.

However, examples of checklist tasks that can be performed by interactive electronic checklist module 202 may include any checklist tasks that represent system elements (e.g., systems, functions, etc.) that are monitored and/or controlled by the autonomy (e.g., FCC 75). Additional examples of checklist tasks that can be performed by interactive electronic checklist module 202 may include items that have a data feed to the FCC 75, as well as underlying actuation of the physical button, switch, etc. For example, extending and/or retracting landing gear or flaps can be performed by interactive electronic checklist module 202. When interactive electronic checklist module 202 determines that one or more checklist tasks in selected interactive electronic checklist 402 can optionally be performed (autonomously) by interactive electronic checklist module 202, interactive electronic checklist module 202 is configured to check whether consent/permission is required before performing one or more checklist tasks in selected interactive electronic checklist 402 at block 314. If consent/permission is not required for at least one or more of the checklist tasks, the flow proceeds to block 308. However, if consent/permission is required before interactive electronic checklist module 202 can perform and/or cause the one or more checklists to be performed, interactive electronic checklist module 202 is configured to request consent from the operator (if consent/permission is required and interactive electronic checklist module 202 does not automatically have permission) of whether one or more checklist tasks in selected interactive electronic checklist 402 are permitted to be performed by interactive electronic checklist module 202 at block 306. For those checklist tasks/items that cannot be reliably monitored by interactive electronic checklist module 202 (and/or FCC 75), these checklist tasks/items will require consent. For example, if interactive electronic checklist module 202 cannot reliably monitor the engine bleed selection, interactive electronic checklist module 202 is configured to prompt the pilot for consent/confirmation that the engine bleeds are set to off or the expected setting. Additionally, for checklist tasks that represent fundamental aircraft configuration changes such as changing the landing gear or retracting/extending flaps, interactive electronic checklist module 202 is configured to request consent to do these if/when needed and/or prompt/remind pilot via checklist that a configuration change is needed.

Figure 5:
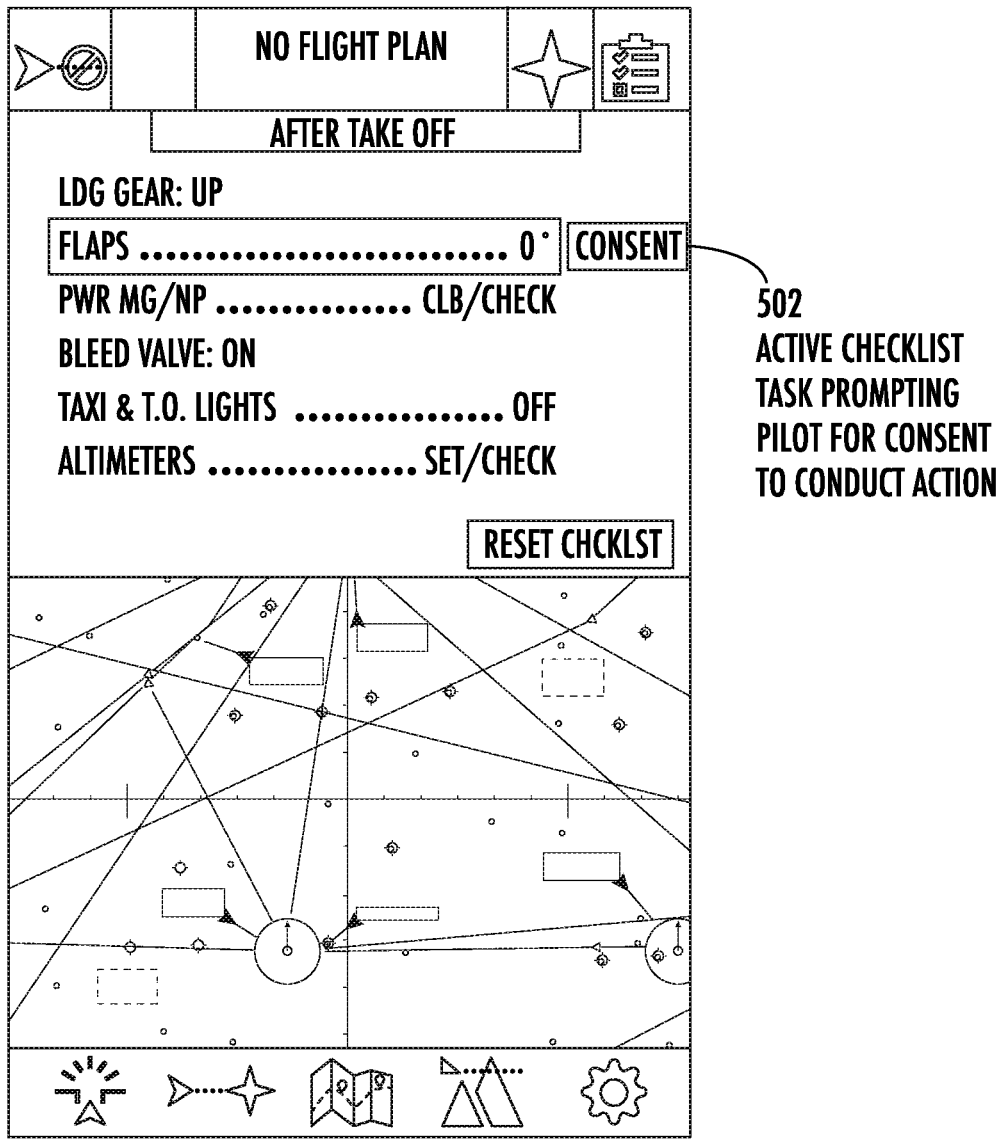
FIG. 5 depicts an example interactive electronic checklists in accordance with one or more embodiments.

FIG. 5 depicts a display of an example interactive electronic checklist in which consent has been requested as shown by block 502. Additionally, the request for consent can be visual on a display screen and/or audible through speakers from interactive electronic checklist module 202. The user may answer with verbal commands, a pointing device (such as a mouse, joystick, etc.), and/or a touch screen. A request for consent for a checklist task could be a request for permission to retract the flaps, retract landing gear, and/or extend landing gear, and the pilot could respond "not right now" which may cause a reminder to be set for a later time if the checklist task has not been completed by that time; this is referred to as a "bypass" which means the pilot does not wish to immediately perform this task but may permit interactive electronic checklist module 202 to perform the checklist task later. On the other hand, when the operator responds negative to anyone of the one or more checklist tasks capable of being performed by interactive electronic checklist module 202, interactive electronic checklist module 202 is not permitted to perform those particular checklist tasks in selected interactive electronic checklist 402, and the flow proceeds to block 312. When the operator responds negative, this is an "override" which means the operator is permanently overriding the suggestion/decision/automated capability by interactive electronic checklist module 202 to perform the task. If interactive electronic checklist module 202 determines that the human operator is stressed, has a workload that is too high (based on present requirements), is experiencing a threshold condition requiring his/her immediate attention, and/or has failed to be aware of a checklist task, interactive electronic checklist module 202 is configured to take responsibility for the one or more checklist tasks capable of being performed by interactive electronic checklist module 202 and/or request permission again. As an example implementation, FIG. 5 also illustrates the use of dots to indicate whether or not a checklist task is complete. As seen in FIG. 5, no dots (i.e., the absence of dots) indicate checklist tasks are complete. To indicate checklist tasks which are incomplete, all dots leading up to action are shown to the right of the checklist task. To indicate checklist tasks which are in transition, flashing of or decreasing amount of dots can be used. For example, landing gear up takes several seconds to complete so in this case if the pilot were looking at this checklist he/she would see "LDG GEAR . . . UP" with the dots flashing or decreasing in number while "UP" moves left towards "LDG GEAR" to eventually display "LDG GEAR UP" once the checklist task is complete. This is one example implementation to address timing of an example checklist task event, and it should be appreciated that other methods can be utilized to show the pilot that a checklist task is in progress. As noted herein, interactive electronic checklist module 202 is configured to request permission (only) where/when appropriate. Interactive electronic checklist module 202 is configured to determine when a checklist needs to occur or be presented, but interactive electronic checklist module 202 will not ask for permission to complete each checklist task/step that interactive electronic checklist module 202 is capable of accomplishing itself. Rather, interactive electronic checklist module 202 will (only) ask permission for checklist steps/tasks that it can perform and that also represent aircraft configuration changes, for example, changing flaps (shown with consent button 502 in FIG. 5) or landing gear. Because these examples are context sensitive aircraft changes, interactive electronic checklist module 202 is configured to request the pilot's consent to make these changes. However, for checklist tasks, such as the interactive electronic checklist module 202 confirming the taxi and takeoff lights have been turned off, interactive electronic checklist module 202 is configured perform such checklist tasks, and the pilot will see on the display that these checklist tasks have been checked off/ green, thereby removing such checklist tasks from his/her cue (and reducing the workload of the pilot having to perform this task herself/himself).

Interactive electronic checklist module 202 can display a certain interactive electronic checklist 404 that needs to be completed if the pilot has not already initiated it. For example, if at 5000 feet (ft), the "After Takeoff Checklist" still has not been completed, interactive electronic checklist module 202 is configured to initiate it by changing the white checklist icons to green (e.g., icons in FIG. 5) and prompt the pilot. The pilot can view the displayed interactive electronic checklist 404 to see which checklist tasks (i.e., items) have been completed by the interactive electronic checklist module 202 already; the pilot then remembers/see his or her responsible checklist tasks and performs them. For normal checklists, interactive electronic checklist module 202 will initiate interactive electronic checklist and/or remind (audibly and/or visually) the pilot that it is time to perform her/his checklist tasks. In other cases, for example, for some abnormal checklists/procedures associated with fire being detected in Eng. 1, interactive electronic checklist module 202 is configured to ask permission to shut down the engine.

Referring back to FIGS. 3 and 4, when the operator grants permission (if permission is required and interactive electronic checklist module 202 does not automatically have permission) for anyone of the checklist tasks in selected interactive electronic checklist 402 and/or when permission is not required, interactive electronic checklist module 202 is configured to perform the one or more checklist tasks permitted by the operator according to the sequential order enumerated in the selected interactive electronic checklist 402 in accordance with the sequence checklist tasks being performed by the operator, at block 308. Some checklist tasks in interactive electronic checklist 402 can be performed concurrently, while others are required to be performed in the chronological order (when required) in which the checklist tasks are listed. Additionally and/or alternatively, interactive electronic checklist module 202 can perform some or all of its assigned checklist tasks before, while, or after the pilot performs his/her checklist task. Interactive electronic checklist module 202 is configured to identify/ complete checklist tasks that have dependencies and/or are not required to be performed in chronological order. Taking a "descent checklist" for an aircraft operating in an instrument flight rules (IFR) environment as an example, the aircraft is not allowed to start descent until given permission by Air Traffic Control, and as such, one or more checklist tasks in "descent checklist" may be dependent upon receiving permission from Air Traffic Control which could be a checklist task. Taking abnormal checklists as another example, there are cases where checklists tasks/steps may occur at a later moment in time, and therefore that step needs to be placed into a different (later) checklist, for example, DC BUS 1 OFF abnormal condition. There can be a checklist task (or step) in this abnormal checklist (e.g., DC BUS 1 OFF) to pull the Idle Gate lever after landing, so interactive electronic checklist module 202 is configured to insert this checklist task into the "Landing Checklist." Interactive electronic checklist module 202 is configured to create hybrid checklists and/or build variants of checklists to suit the needs of the situation, especially as it relates to abnormal procedures/checklists. It can be understood that the interactive electronic checklist allows the operator/pilot to see display of his/her responsible checklist tasks at a glance, as well as checklist tasks permitted to be performed by interactive electronic checklist module 202. Using interactive electronic checklist module 202, display of interactive electronic checklists provides a means for the pilot to transfer assignment of checklist tasks back to the autonomy and/or take control of a checklist task from the autonomy in a teamwork paradigm analogous to a two-person crew. Accordingly, interactive electronic checklist module 202 can provide a shared teamwork model for autonomous aircraft with a single human pilot/operator.

Referring back to FIG. 3, at block 310, interactive electronic checklist module 202 is configured to notify the operator of the status for each checklist task in interactive electronic checklist 402. For example, the interactive electronic checklist displays whether each checklist task is active, completed, failed, and/or queued. Interactive electronic checklist module 202 is configured to reflect the status of aircraft 10 associated with particular checklist tasks in the interactive electronic checklist even if the pilot has not explicitly selected the checklist tasks and/or has not been displayed the interactive electronic checklist. For example, if interactive electronic checklist module 202 detects that the landing gear is up and the bleed valves are turned on when the operator proceeds to, for example, the "After Takeoff Checklist", the pilot will view those checklist tasks in green/checked off in interactive electronic checklist. Interactive electronic checklist module 202 will not ask for permission to check those checklist tasks when the pilot has already done them. Interactive electronic checklist module 202 automatically knows the status and updates the checklist tasks accordingly.

In a typical paper checklist, there can be instances of abnormal checklists which make references to other checklists. In a case where one or more of the interactive electronic checklists 402 comprise abnormal checklists, these abnormal can contain embedded procedures such as, for example, when the emergency is loss of pressurization, after performing the necessary tasks like securing an oxygen mask the next step is to see the "emergency descent" procedure. For a typical paper checklist, this situation can become overwhelming or stressful in the cockpit because the operator/pilot would have to flip through and find multiple procedures. However, in accordance with one or more embodiments, interactive electronic checklist module 202 is configured with the ability to embed those procedures (for abnormal checklists and/or any checklist) in the respective interactive electronic checklists 402 such that the operator simply has to select a button/hot link to the embedded procedure, because the button/hot link is displayed in the interactive electronic checklist 402. Interactive electronic checklist module 202 of FCC 75 (i.e., the autonomy system) can build/display the correct flow via the human machine interface (HMI) rather than requiring the pilot to flip through multiple abnormal procedures checklists. In this example, "emergency descent" procedure is displayed and/or is accessed automatically from the loss of pressure checklist and may prompt the operator how fast or slow he/she desires to descend in aircraft 10. It should be appreciated that there can be multiple abnormal checklists that have conditional statements such as "if/then" statements. Interactive electronic checklist module 202 can simplify conditional statements related to, for example, embedded links in interactive electronic checklist 402 for the single pilot, by deducing those states already thus simplifying the abnormal checklist flow. Using the previous example, once the interactive electronic checklist module 202 detects/determines (e.g., using a motion sensor, trigger, etc.) that the pilot has secured an oxygen mask, interactive electronic checklist module 202 can automatically select the button/embedded link to the subsequent embedded procedure (e.g., "emergency descent" procedure) and/or inquire (audibly and/or visually) how fast or slow do you desire to descend aircraft 10.

Figure 6:
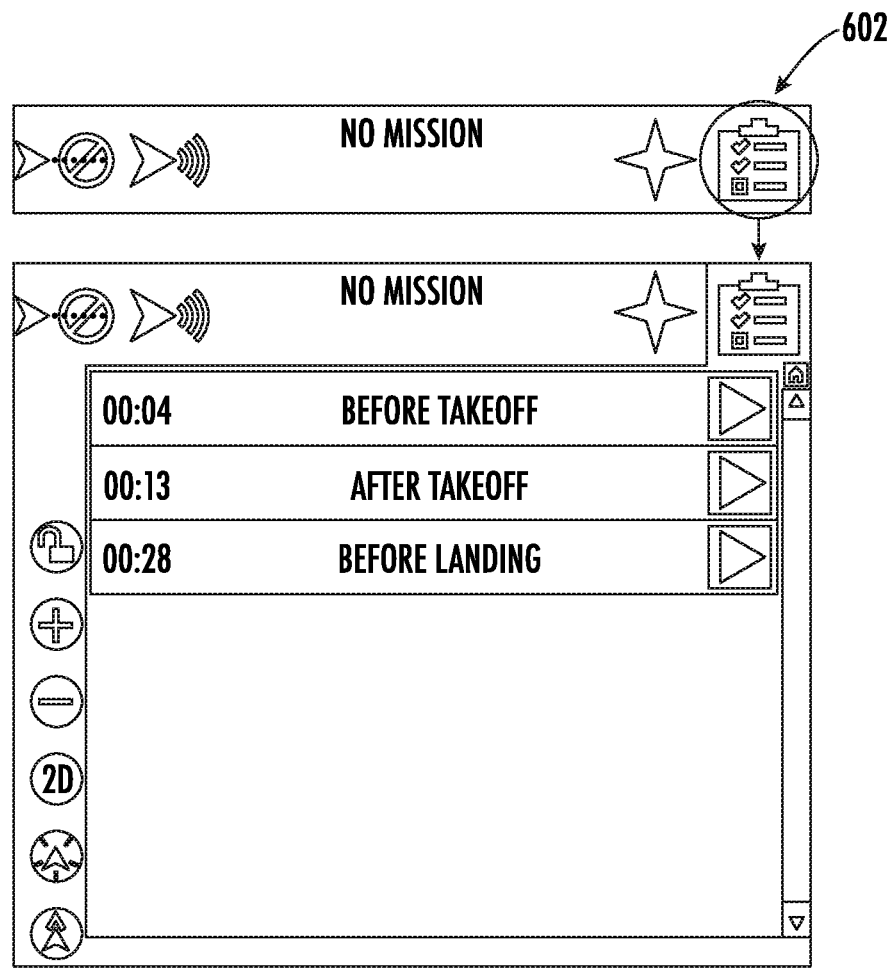
FIG. 6 depicts an example interactive electronic checklists in accordance with one or more embodiments.

FIGS. 6-10 display further examples of interactive electronic checklists used by interactive electronic checklist module 202 according to one or more embodiments. Although an example scenario is discussed using FIGS. 6-10, it should be understood that the discussion is for explanation purposes and interactive electronic checklist may include more or fewer features according to one or more embodiments. As discussed above, interactive electronic checklist module 202 can determine which interactive electronic checklist to be selected for interactive display to the operator; additionally, this example scenario illustrates that interactive electronic checklist (i.e., aircraft specific interactive electronic checklists and operating procedures) can also be accessed through a checklist icon 602 on the top menu of the main page shown in FIG. 6. FIG. 6 illustrates user interaction and/or autonomous execution by interactive electronic checklist module 202 to open interactive electronic checklists. Selection of checklist icon 602 allows the operator to monitor aircraft and system status, perform timely actions, delay or defer recommended actions, and assign or alter autonomous actions if feasible. In response to checklist icon 602 being selected from the top menu by the operator and/or interactive electronic checklist module 202, the list of interactive electronic checklists (e.g., interactive electronic checklists 404) (aircraft-specific checklists and any supporting procedures for mission requirements) stored within the system knowledge base are displayed for selection on main page in FIG. 6. The system knowledge base can be stored in memory 94, coupled to FCC 75, and/or coupled to interactive electronic checklist module 202 for access by interactive electronic checklist module 202. In this example scenario, three interactive electronic checklists are illustrated with titles "Before Takeoff", "After Takeoff", and "Before Landing" as seen in FIG. 6. It should be appreciated that there can be more or fewer interactive electronic checklists illustrated, and embodiments are not meant to be limited to the listed interactive electronic checklists.

Figure 7:
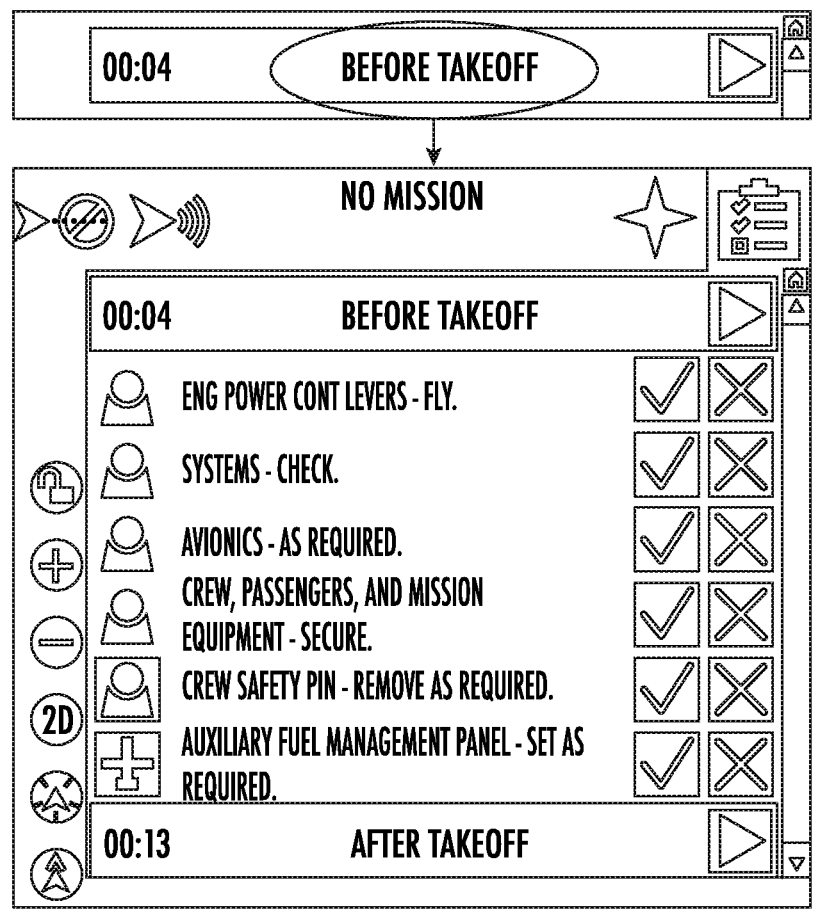
FIG. 7 depicts an example interactive electronic checklists in accordance with one or more embodiments.

FIG. 7 illustrates user interaction and/or autonomous execution by interactive electronic checklist module 202 to view an interactive electronic checklist. Using interactive electronic checklist module 202, selection by the operator and/or interactive electronic checklist module 202 of an interactive electronic checklist, such as, for example, "Before Takeoff", expands the selected interactive electronic checklist which enumerates all checklist tasks including actions and recommended steps required for completion as depicted in FIG. 7. As seen in FIGS. 6 and 7, to the left of the interactive electronic checklist is the estimated time (e.g., in hours and minutes) to the start of the interactive electronic checklist. For example, FIG. 7 shows 4 minutes (e.g., 00:04) to the start of the "Before Takeoff" interactive electronic checklist. FIG. 7 also shows buttons to the right of the title (e.g., "Before Takeoff") and its associated checklist tasks, and these buttons facilitate pilot interaction with the interactive electronic checklist and its associated checklist tasks. The interactive electronic checklist module 202 can also interact with these buttons.

Figure 8:
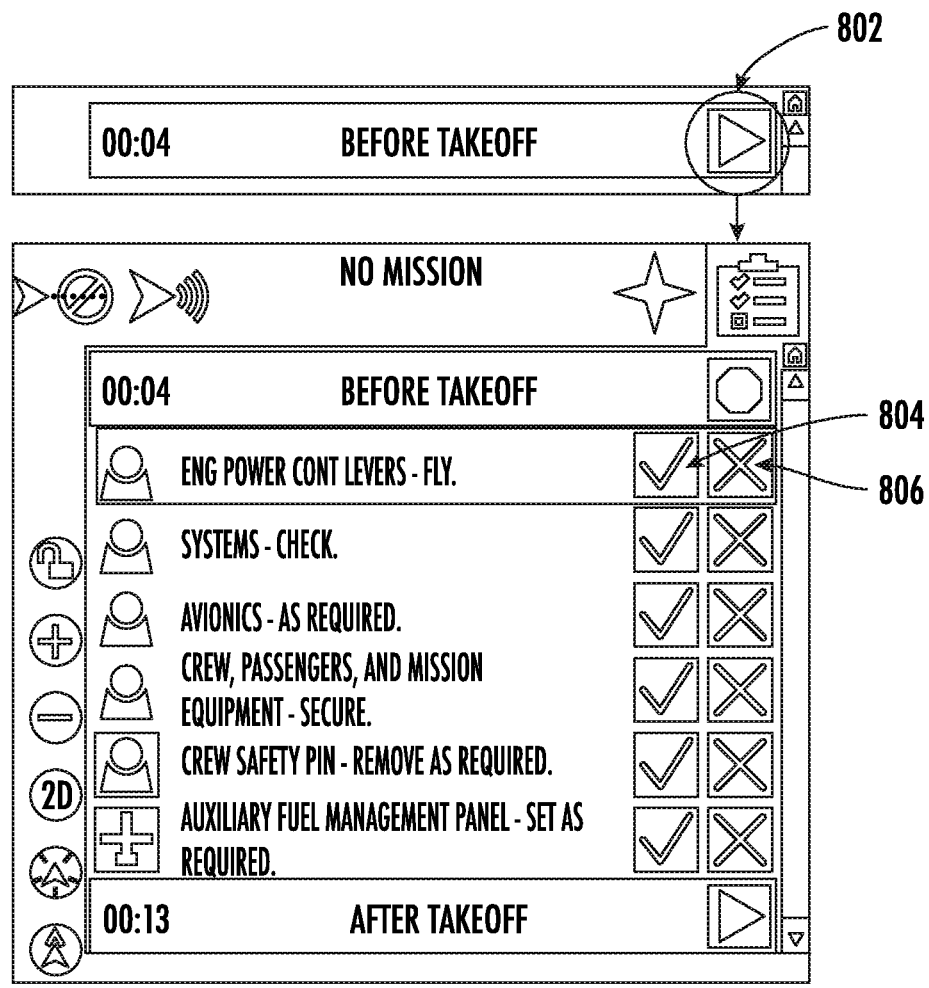
FIG. 8 depicts an example interactive electronic checklists in accordance with one or more embodiments.

FIG. 8 illustrates user interaction and/or autonomous execution by interactive electronic checklist module 202 to start a procedure for the interactive electronic checklist. For example, pressing/initiating the green "play" button 802 next to the title (e.g., "Before Takeoff") initiates that interactive electronic checklist procedure as depicted in FIG. 8. The "play" button 802 is illustrated with a triangular shape. Buttons 804 and 806 to the right of each checklist task allow the pilot to mark the task complete (e.g., with a green check mark) or failed (e.g., with red "X"), respectively. In FIG. 8, both the task complete and task failed marks are shown as available for selection. In one or more embodiments, the spaces to the right of each checklist task can be blank initially, and then the pilot and/or interactive electronic checklist module 202 can make the desired selection, for example, task complete (e.g., with a green check mark) or failed (e.g., with red "X").

Figure 9:
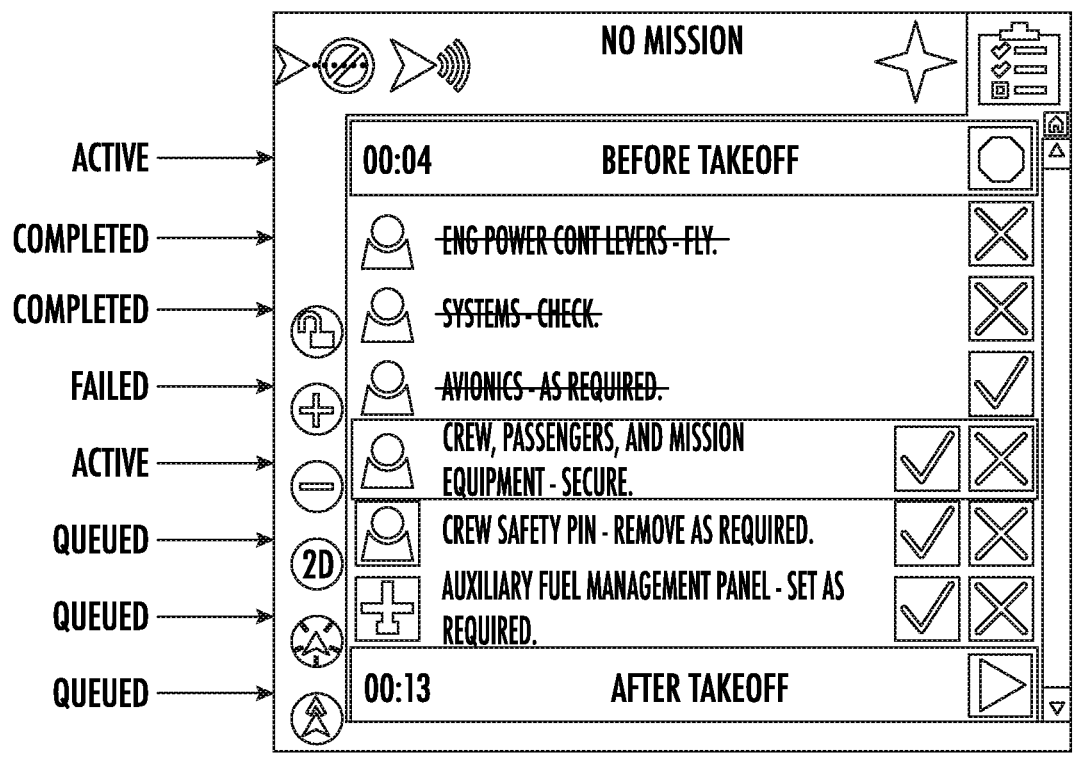
FIG. 9 depicts an example interactive electronic checklists in accordance with one or more embodiments.
Figure 10:
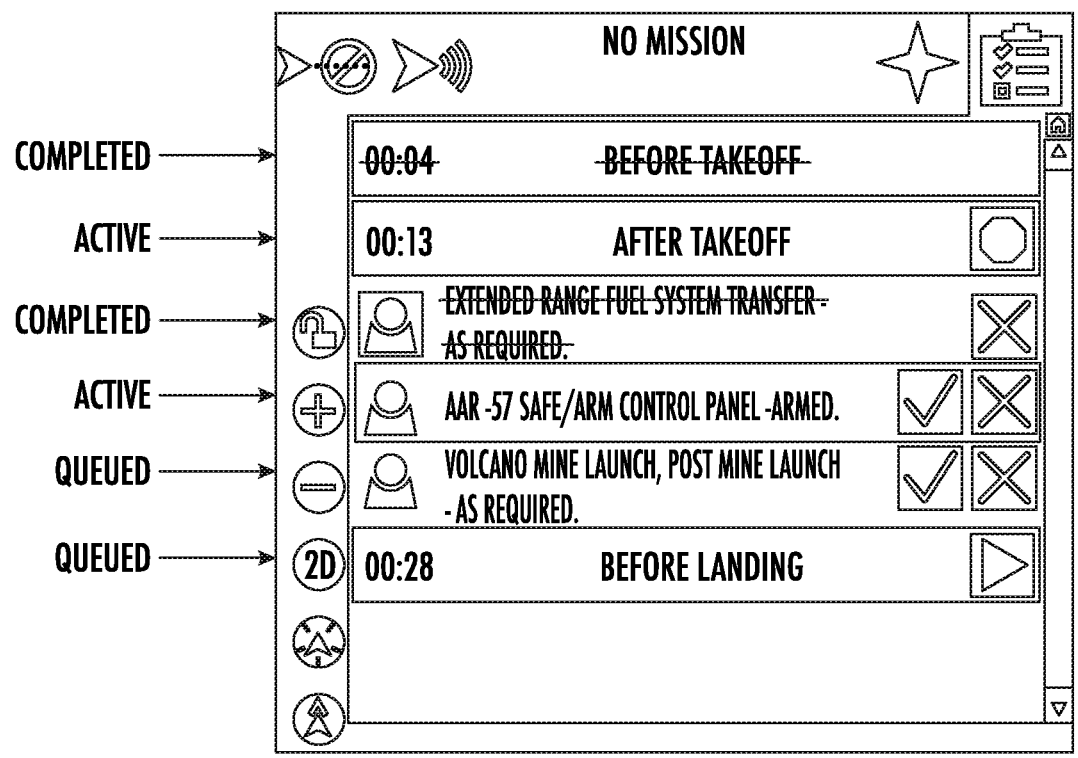
FIG. 10 depicts an example interactive electronic checklists in accordance with one or more embodiments.

FIG. 9 illustrates user interaction and/or autonomous execution by interactive electronic checklist module 202 to mark checklist tasks complete or failed. FIG. 10 illustrates display of interactive electronic checklists as completed, active, or queued. FIGS. 9 and 10 can use color coding to mark the status of a checklist task and/or interactive electronic checklist (procedure). Some example color coding and markings are noted below for illustrative purposes. For example, a queued interactive electronic checklist and/or queued checklist task is one that is to be completed in the future, which may be denoted with bold, white text. An active interactive electronic checklist and/or active checklist task is one that is in progress, which may be denoted with bold, magenta text with a magenta outline. A completed interactive electronic checklist or completed checklist task is one that has been completed, which may be denoted with a strikethrough and green text. A failed interactive electronic checklist or failed checklist task is one that has failed, which may be denoted with a strikethrough and red text.

The human operator/pilot and/or autonomous system (e.g., interactive electronic checklist module 202) assigned to each checklist task is indicated by icons along the left side of the display. For example, the human icon indicates that the pilot is responsible to complete the associated checklist task, while the aircraft icon indicates that the autonomous system (e.g., interactive electronic checklist module 202) is responsible for completing the associated checklist task. If both human operator/pilot and/or autonomous system (e.g., interactive electronic checklist module 202) are capable of completing the checklist task, a box appears around the icon indicating that it is a button that the pilot can toggle to assign responsibility to either himself/herself or to the autonomous system (e.g., interactive electronic checklist module 202). If a box does not appear around the icon, then only the pilot or autonomous system (e.g., interactive electronic checklist module 202) is capable of performing that checklist task, so the checklist task cannot be allocated or toggled. Alternatively or additionally, both the human icon and airplane icon can appear along the left side of the displayed checklist task as an indication that both the pilot and/or autonomous system (e.g., interactive electronic checklist module 202) can perform the checklist task.

It should be appreciated that one or more embodiments satisfy the general human machine interface (HMI) guidelines. Technical advantages and benefits include providing visual feedback of activation, minimizing the number of operator inputs, maintaining a consistent look and feel, and enabling the operator to accurately monitor system actions within the mission context. One or more embodiments allow the operator to defer recommended actions and assign responsible agents (e.g., the operator and/or autonomous system) to optimize workload and mission efficiency.

Figure 11:
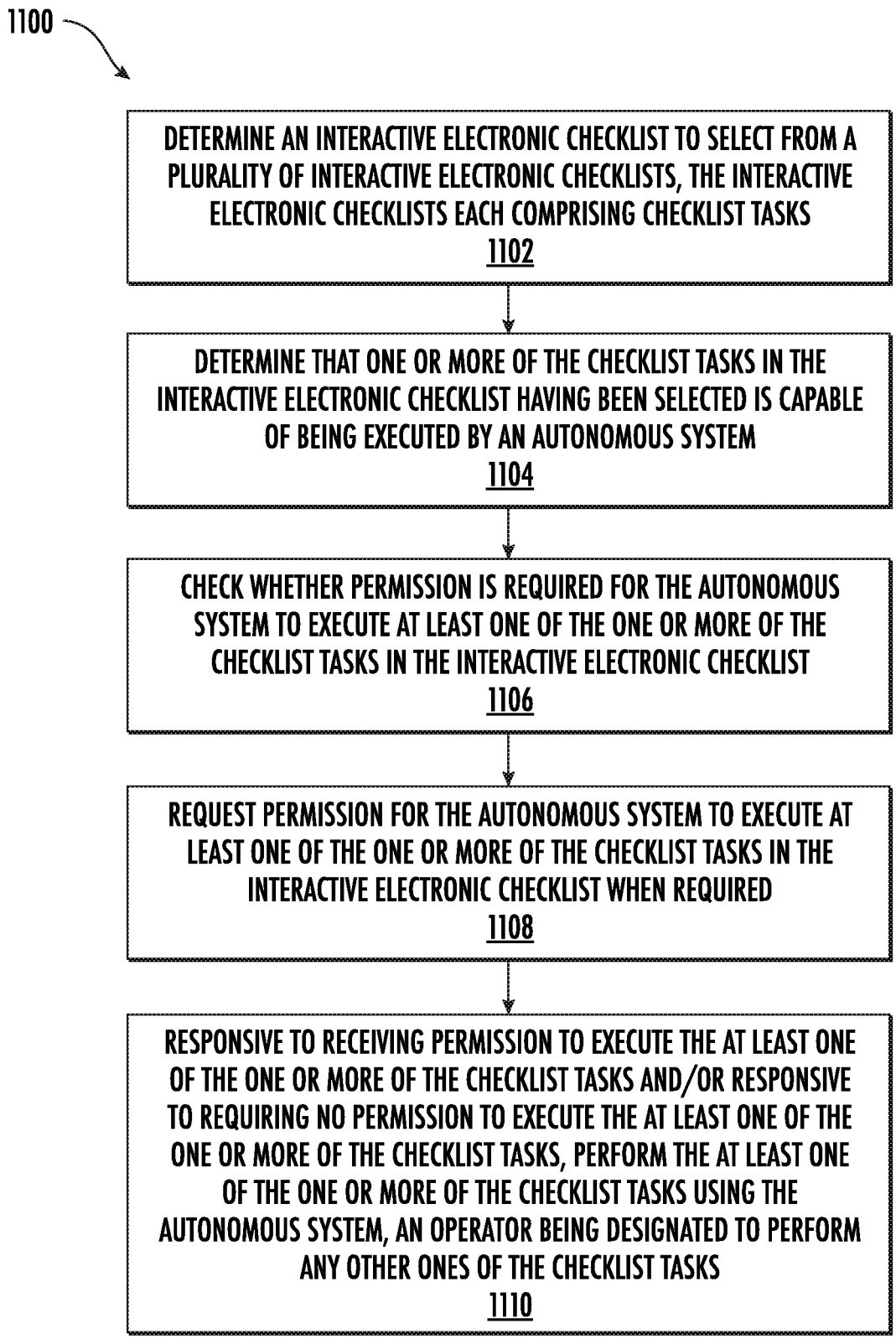
FIG. 11 is a flowchart of a method for interactive aircraft operation according to one or more embodiments.

FIG. 11 is a flowchart of a method 1100 for interactive aircraft operation according to one or more embodiments. At block 1102, interactive electronic checklist module 202 of FCC 75 is configured to determine an interactive electronic checklist to select from a plurality of interactive electronic checklists, the interactive electronic checklists each comprising checklist tasks. At block 1104, interactive electronic checklist module 202 of FCC 75 is configured to determine that one or more of the checklist tasks in the interactive electronic checklist having been selected is capable of being executed by an autonomous system (e.g., interactive electronic checklist module 202). At block 1106, interactive electronic checklist module 202 of FCC 75 is configured to check whether permission is required for the autonomous system to execute at least one of the one or more of the checklist tasks in the interactive electronic checklist 404. At block 1108, interactive electronic checklist module 202 of FCC 75 is configured to request permission for the autonomous system (e.g., interactive electronic checklist module 202) to execute at least one of the one or more of the checklist tasks in the interactive electronic checklist when required. At block 1110, interactive electronic checklist module 202 of FCC 75 is configured to, responsive to receiving permission to execute the at least one of the one or more of the checklist tasks and/or responsive to requiring no permission to execute the at least one of the one or more of the checklist tasks, perform (and/or cause FCC 75 to perform) the at least one of the one or more of the checklist tasks using the autonomous system, an operator being designated to perform any other ones of the checklist tasks.

The autonomous system (e.g., interactive electronic checklist module 202) is operable to select the interactive electronic checklist according to a phase in aircraft operation. The autonomous system is operable to select the interactive electronic checklist according to a threshold condition occurring on an aircraft 10. The autonomous system is operable to receive a diagnosis or determine the diagnosis of threshold conditions occurring on an aircraft 10, and responsive to the diagnosis, the autonomous system is operable to prioritize the threshold conditions and select the interactive electronic checklist corresponding to a highest priority of the threshold conditions. For example, in a case of multiple failures on aircraft 10 which trigger multiple corresponding abnormal/emergency checklists, interactive electronic checklist module 202 is configured to prioritize emergency/abnormal checklists for display to the pilot based on condition or fault, phase of flight, and/or any other threshold or context considerations.

Each of the checklist tasks comprises an indication of whether completion is capable of being performed by the autonomous system (e.g., interactive electronic checklist module 202). The indication is predetermined in advance. The at least one of the one or more of the checklist tasks is performed by the autonomous system in chronological order when required with the any other ones of the checklist task to be performed by the operator. Receiving permission to execute the at least one of the one or more of the checklist tasks comprises receiving a selection permitting the at least one of the one or more of the checklist tasks to be performed by the autonomous system.

Figure 12:
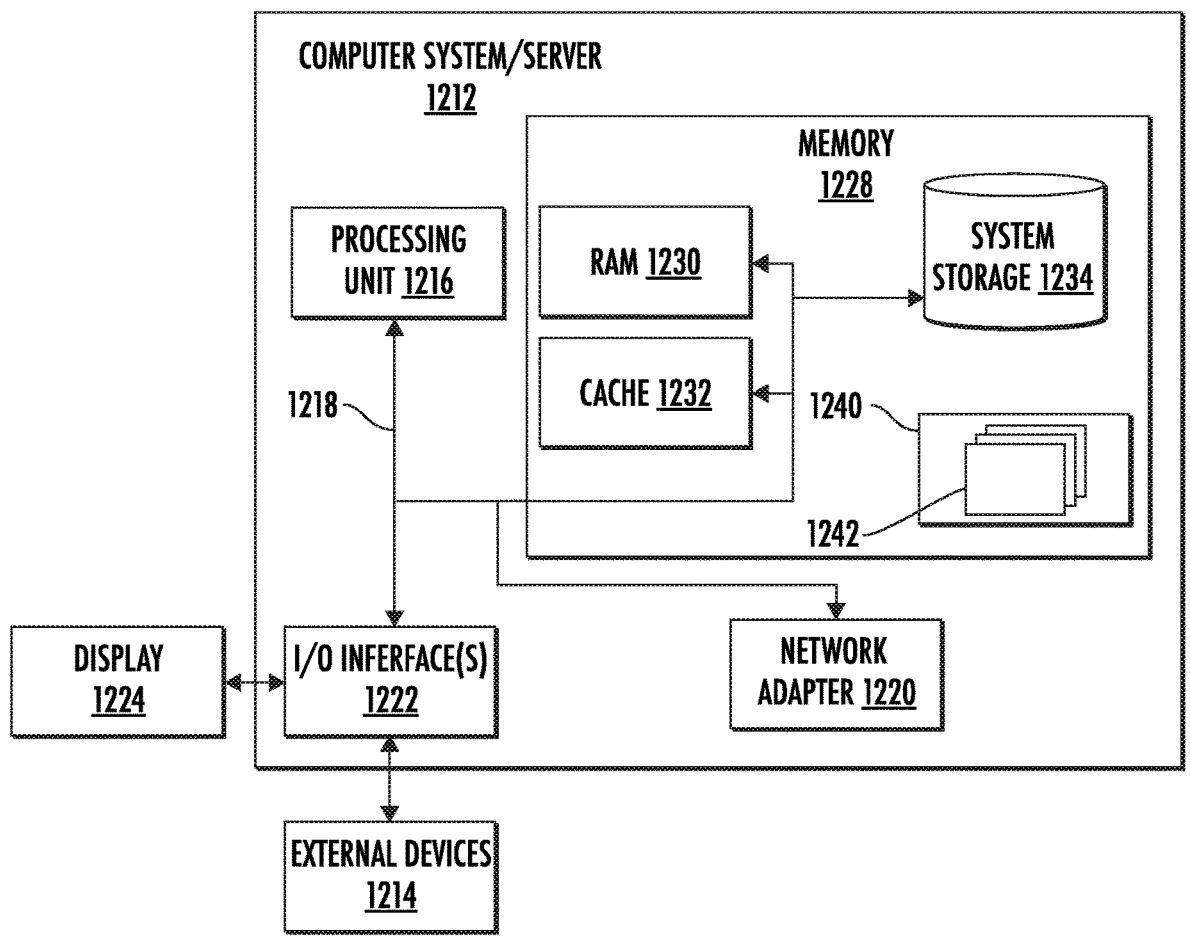
FIG. 12 depicts a schematic of an example computing system having functions and features utilized in accordance with one or more embodiments.

FIG. 12 depicts a schematic of an example computing system 1212 having functions and features utilized according to one or more embodiments. The computer system 1212 can be operational with numerous other general purpose or special purpose computing system environments or configurations. The computer system 1212 can be representative of various types of computer systems on which operations and functions can run in the aircraft 10. The functions and capabilities of computing system 1212 can be utilized in FIGS. 1-11 to implement one or more features of the flight control system 70 including flight control computer 75, interactive electronic checklist module 202, etc., according to embodiments.

Computer system 1212 may be described in the general context of computer system-executable instructions, such as program modules, being executed by a computer system. Generally, program modules may include routines, programs, objects, components, logic, data structures, and so on that perform particular tasks or implement particular abstract data types. Computer system 1212 may be practiced in distributed cloud computing environments where tasks are performed by remote processing devices that are linked through a communications network. In a distributed cloud computing environment, program modules may be located in both local and remote computer system storage media including memory storage devices.

The components of computer system 1212 may include, but are not limited to, one or more processors or processing units 1216, a system memory 1228, and a bus 1218 that couples various system components including system memory 1228 to processor 1216. Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 1212 typically includes a variety of computer system readable media. Such media may be any available media that is accessible by computer system 1212, and it includes both volatile and non-volatile media, removable and non-removable media. The system memory 1228 can include computer system readable media in the form of volatile memory, such as random access memory (RAM) 1230 and/or cache memory 1232. Computer system 1212 may further include other removable/non-removable, volatile/non-volatile computer system storage media. By way of example only, storage system 1234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1218 by one or more data media interfaces. Memory 1228 may include at least one program product having a set (e.g., at least one) of program modules that are configured to carry out the functions of embodiments.

Program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments as described herein.

Computer system 1212 may also communicate with one or more external devices 1214 such as a keyboard, a pointing device, a display 1224, etc.; one or more devices that enable a user to interact with computer system 1212; and/or any devices (e.g., network card, modem, etc.) that enable computer system 1212 to communicate with one or more other computing devices. Such communication can occur via Input/Output (I/O) interfaces 1222. Still yet, computer system 1212 can communicate with one or more networks such as a local area network (LAN), a general wide area network (WAN), and/or a public network (e.g., the Internet) via network adapter 1220. As depicted, network adapter 1220 communicates with the other components of computer system 1212 via bus 1218. It should be understood that although not shown, other hardware and/or software components could be used in conjunction with computer system 1212. Examples, include but are not limited to: microcode, device drivers, redundant processing units, external disk drive arrays, RAID systems, tape drives, and data archival storage systems, etc.

Embodiments may be a system, a method, and/or a computer program product at any possible technical detail level of integration. The computer program product may include a computer readable storage medium (or media) having computer readable program instructions thereon for causing a processor to carry out embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform embodiments.

Embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. By way of example, aspects of the invention can be used in other forms of aircraft, including coaxial aircraft, tilt rotor aircraft and fixed wing aircraft. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for interactive aircraft operation, the method comprising:
    selecting, by a computer system comprising one or more processors on an aircraft, an interactive electronic checklist from a plurality of interactive electronic checklists based at least on a stage of operations of the aircraft and according to a threshold condition occurring on the aircraft, each of the plurality of interactive electronic checklists comprising checklist tasks for the operations of the aircraft;
    determining, by the computer system, that a first subset of the checklist tasks in the interactive electronic checklist is to be executed by an autonomous system for the operations;
    determining, by the computer system, that a second subset of the checklist tasks in the interactive electronic checklist is to be performed by an operator; and
    performing, by the computer system, at least one of the first subset of the checklist tasks using the autonomous system, at least partially concurrent to displaying to the operator at least one of the second subset of the checklist tasks.

2. The method of claim 1, wherein the autonomous system is operable to select the interactive electronic checklist according to a phase in aircraft operation.

3. The method of claim 1, wherein the autonomous system is operable to receive a diagnosis or determine the diagnosis of threshold conditions occurring on the aircraft; and
    wherein responsive to the diagnosis, the autonomous system is operable to prioritize the threshold conditions and select the interactive electronic checklist corresponding to a highest priority of the threshold conditions.

4. The method of claim 1, wherein each of the checklist tasks in the plurality of interactive electronic checklists comprises an indication of whether completion is performable by the autonomous system.

5. The method of claim 4, wherein the indication is predetermined in advance.

6. The method of claim 1, wherein the at least one of the first subset of the-checklist tasks is performed by the autonomous system in response to at least one of the second subset of the checklist tasks to be performed by the operator.

7. The method of claim 1, further comprising checking whether permission is required for the autonomous system to execute the one or more of the checklist tasks in the interactive electronic checklist; and
    requesting the permission for the autonomous system to execute the one or more of the first subset of the checklist tasks in the interactive electronic checklist when required, wherein the one or more of the first subset of the checklist tasks is performed using the autonomous system responsive to receiving the permission, and wherein receiving the permission comprises receiving a selection permitting the one or more of the first subset of the checklist tasks to be performed by the autonomous system.

8. A system for interactive aircraft operation, the system comprising:
    a computing system on an aircraft, the computing system comprising at least one processor coupled with memory comprising computer-executable instructions that, when executed by the computing system, cause the at least one processor to perform operations comprising:
        selecting an interactive electronic checklist from a plurality of interactive electronic checklists based at least on a stage of operations of the aircraft and according to a threshold condition occurring on the aircraft, each of the plurality of interactive electronic checklists comprising checklist tasks for the operations of the aircraft;
        determining that a first subset of the checklist tasks in the interactive electronic checklist is to be executed an autonomous system for the operations;
        determining that a second subset of checklist tasks in the interactive electronic checklist is to be performed by an operator; and
        performing at least one of the first subset of checklist tasks using the autonomous system, at least partially concurrent to displaying to the operator at least one of the second subset of checklist tasks.

9. The system of claim 8, wherein the interactive electronic checklist is autonomously selected according to a phase in aircraft operation.

10. The system of claim 8, wherein the interactive electronic checklist is autonomously selected according to the threshold condition occurring on the aircraft.

11. The system of claim 8, wherein a diagnosis of threshold conditions occurring on the aircraft is received or determined; and
    wherein responsive to the diagnosis, the threshold conditions are prioritized and the interactive electronic checklist corresponding to a highest priority of the threshold conditions is selected.

12. The system of claim 8, wherein each of the checklist tasks in the plurality of interactive electronic checklists comprises an indication of whether completion is performable by the autonomous system.

13. The system of claim 12, wherein the indication is predetermined in advance.

14. The system of claim 8, wherein the at least one of the first subset of the checklist tasks is performed by the autonomous system in response to at least one of the second subset of the checklist tasks to be performed by the operator.

15. The system of claim 8, further comprising checking whether permission is required to autonomously execute the one or more of the checklist tasks in the interactive electronic checklist; and
    requesting the permission for autonomous execution of the one or more of the first subset of the checklist tasks in the interactive electronic checklist when required, wherein the one or more of the first subset of the checklist tasks is performed by the autonomous system responsive to receiving the permission or, and wherein receiving the permission comprises receiving a selection permitting the the first subset of the checklist tasks to be performed by the autonomous system.

16. A computer program product for interactive aircraft operation comprising a computer readable storage medium having program instructions embodied therewith, the program instructions executable by a processor to cause the processor to perform operations comprising:
    selecting an interactive electronic checklist from a plurality of interactive electronic checklists based at least on a stage of operations of the aircraft and according to a threshold condition occurring on the aircraft, each of the plurality of interactive electronic checklists each comprising checklist tasks for the operations of the aircraft;
    determining that a first subset of the checklist tasks in the interactive electronic checklist selected is to be executed by an autonomous system for the operations;
    determining that a second subset of the checklist tasks in the interactive electronic checklist is to be performed by an operator; and
    performing at least one of the first subset of the checklist tasks using the autonomous system, at least partially concurrent to displaying to the operator at least one of the second subset of the checklist tasks.

17. The computer program product of claim 16, wherein the interactive electronic checklist is autonomously selected according to a phase in aircraft operation.

18. The computer program product of claim 16, wherein the interactive electronic checklist is autonomously selected according to the threshold condition occurring on the aircraft.

19. The computer program product of claim 16, wherein a diagnosis of threshold conditions occurring on the aircraft is received or determined; and
    wherein responsive to the diagnosis, the threshold conditions are prioritized and the interactive electronic checklist corresponding to a highest priority of the threshold conditions is selected.

\* \* \* \* \*